US006743396B2

(12) United States Patent
Wagner et al.

(10) Patent No.: US 6,743,396 B2
(45) Date of Patent: Jun. 1, 2004

(54) METHOD FOR PRODUCING ALMN STRIPS OR SHEETS

(75) Inventors: Pascal Wagner, Bonn (DE); Wolf-Dieter Finkelnburg, Bonn (DE); Dietrich Wieser, Bonn (DE); Manfred Mrotzek, Buxtehude (DE)

(73) Assignee: Hydro Aluminium Deutschland GmbH, Cologne (DE)

( * ) Notice: Subject to any disclaimer, the term of this patent is extended or adjusted under 35 U.S.C. 154(b) by 5 days.

(21) Appl. No.: 10/115,712

(22) Filed: Apr. 2, 2002

(65) Prior Publication Data
US 2003/0042290 A1 Mar. 6, 2003

(30) Foreign Application Priority Data

Apr. 4, 2001 (DE) .......................... 101 16 636

(51) Int. Cl.[7] .......................... C22C 21/16; C22F 1/04; B23K 31/02
(52) U.S. Cl. ...................... 420/534; 420/530; 420/535; 420/545; 148/549; 148/551; 228/158; 228/235.2; 228/262.5
(58) Field of Search ............................. 228/158, 235.2, 228/235.3, 262.1, 262.5; 420/528, 535, 530, 544, 545; 148/437, 439, 549, 551

(56) References Cited

U.S. PATENT DOCUMENTS

| 3,851,787 | A | * | 12/1974 | Setzer et al. ................. 220/273 |
| 4,235,628 | A | * | 11/1980 | Althoff et al. ............... 420/534 |
| 4,632,885 | A | * | 12/1986 | Tanabe et al. ............... 428/654 |
| 5,176,205 | A | | 1/1993 | Anthony ...................... 165/133 |
| 6,309,481 | B1 | * | 10/2001 | Koch et al. .................. 148/440 |
| 6,355,090 | B1 | * | 3/2002 | Ohyama et al. ............... 75/687 |
| 2002/0043311 | A1 | * | 4/2002 | Selepack et al. ............. 148/551 |
| 2003/0143102 | A1 | * | 7/2003 | Matsuoka et al. ............ 420/546 |

FOREIGN PATENT DOCUMENTS

| GB | 2 353 750 A | | 7/2001 | ........... B23K/35/28 |
| JP | 03-134129 | | 6/1991 | ........... C22C/21/00 |
| JP | 03-287738 | | 12/1991 | ........... C22C/21/00 |
| JP | 04-202735 | | 7/1992 | ........... C22C/21/00 |
| JP | 08-246117 A | * | 6/1996 | |
| WO | WO 97/18946 | | 5/1997 | ........... B32B/15/01 |

* cited by examiner

*Primary Examiner*—L. Edmondson
(74) *Attorney, Agent, or Firm*—Proskauer Rose LLP

(57) ABSTRACT

The present invention relates to a method for producing AlMn strips or sheets for producing components by soldering, wherein a precursor material is produced from a melt which contains (in weight-percent) Si: 0.3–1.2%, Fe: ≦0.5%, Cu: ≦0.1%, Mn: 1.0–1.8%, Mg: ≦0.3%, Cr+Zr: 0.05–0.4%, Zn: ≦0.1% , Ti: ≦0.1% , Sn: ≦0.15%, and unavoidable companion elements, whose individual amounts are at most 0.05% and whose sum is at most 0.15%, as well as aluminum as the remainder, wherein the precursor material is preheated at a preheating temperature of less than 520° C. over a dwell time of at most 12 hours, wherein the preheated precursor material is hot rolled into a hot strip using a final hot rolling temperature of at least 250° C., wherein the hot strip is cold rolled into a cold strip without intermediate annealing.

34 Claims, No Drawings

METHOD FOR PRODUCING ALMN STRIPS OR SHEETS

BACKGROUND OF THE INVENTION

The present invention relates to a method for producing AlMn strips or sheets for producing components by soldering.

For example, heat exchangers for motor vehicles are typically produced from aluminum sheets, in that the individually premanufactured components of the heat exchangers, such as plates, pipes, and distributors, are connected to one another by soldering. The stresses which, in practical use, act on components produced in this way installed in automobiles, due to shocks, vibrations of longer duration, the effect of corrosion, and similar things, are significant. This particularly applies to the plates, via which the dissipation of heat occurs.

Defects in these heat exchanger components which occur as a consequence of inadequate properties of the aluminum material may lead to significant damage. In this context, those regions of the components concerned in which changes of the microstructure occur due to the heat arising during soldering have been shown to be particularly problematic in the past.

For the reasons described above, in addition to good suitability for soldering, high strength, particularly a high limit of elasticity $R_{p0.2}$, and toughness even after soldering are required of aluminum sheets of the type under discussion. The aluminum sheets concerned must simultaneously have good deformability and a high resistance to corrosion.

A material for producing plates for heat exchangers is known from WO 97/18946 which contains (in weight-percent) 0.2–0.5% Fe, 0.7–1.2% Si, 1.2–1.6% Mn, ≦0.3% Mg, ≦0.05% Cu, ≦0.2% Zn, ≦0.1% Ti, and unavoidable companion elements whose individual amounts are at most 0.05% and whose sum is at most 0.15%, as well as aluminum as the remainder. Ingots are cast from this material as a precursor material, which are subsequently preheated to an initial rolling temperature of at least 520° C. and hot rolled. The cold rolling to the final thickness which follows this is performed in at least two steps, with an intermediate annealing having to be performed for two hours at an annealing temperature lying between 360° C. and 400° C. between the cold rolling steps.

It has been shown in the practical testing of the material produced according to the known method that the material properties of the aluminum sheets produced according to the related art are insufficient for specific applications. This particularly applies for the strength and corrosion resistance still existing after soldering in the region of the soldering joints. In addition, it has been shown in, for example, the production of heat exchangers that the possibilities for the combination of components produced from the material known from WO 97/18946 with heat exchanger components produced from another light metal material are restricted due to the difference of the corrosion potentials, which is too low.

SUMMARY OF THE INVENTION

The object of the present invention is, based on the related art described above, to indicate a method by which aluminum sheets may be produced in a cost-effective way, which, even after soldering, reliably have a high strength, particularly a high limit of elasticity, as well as outstanding corrosion resistance. This object is achieved by a method for producing components by soldering.

DETAILED DESCRIPTION OF THE INVENTION

The aforementioned object is achieved by a method for producing AlMn sheets for producing components by soldering, in which:

a precursor material is produced from a melt which contains (in weight-percent) 0.3–1.2% Si, ≦0.5% Fe, ≦0.1% Cu, 1.0–1.8% Mn, ≦0.3% Mg, 0.05–0.4% Cr+Zr, ≦0.1% Zn, ≦0.% Ti, ≦0.15% Sn, and unavoidable companion elements, whose individual amounts are at most 0.05% and whose sum is at most 0.15%, as well as aluminum as the remainder;

the precursor material is preheated at a preheating temperature of less than 520° C. over a dwell time of at most 12 hours;

the preheated precursor material is hot rolled into a hot strip;

the hot strip is cold-rolled into a cold strip without intermediate annealing; and the cold band may be finally subjected to an annealing treatment.

The present invention is based on a composition of the melt used to produce the precursor material whose alloy contents are tailored to one another in such a way that particularly the danger of intercrystalline corrosion is reduced to a minimum and the corrosive attack due to pitting is distributed uniformly over the surface. As a consequence, high corrosion resistance is ensured.

The alloy used according to the present invention and the parameters of the method for its processing are simultaneously optimized in such a way that an aluminum sheet, which has good deformability and high strength, particularly high values of the limit of elasticity $R_{p0.2}$, and good fracture elongation even after soldering, may be produced from it in a simple way at a hot rolling temperature lying in the middle temperature range without the necessity of intermediate annealing during the cold rolling.

It has been determined that, in the sheets produced according to the present invention, the limit of elasticity $R_{p0.2}$ is at least 60 MPa after soldering. In many cases, a limit of elasticity $R_{p0.2}$ of at least 65 MPa could be established. The corrosion potential was regularly less than −750 mV, in many cases even less than −800 mV (measured against GKE in accordance with ASTM G69).

The silicon content also has a positive influence on the strength of the sheet after soldering in the AlMn sheets produced according to the present invention. However, it has been shown that silicon simultaneously influences the occurrence of intercrystalline corrosion in interaction with tin. In the alloy used according to the present invention, the range predetermined for the silicon content is therefore selected in relation to the content of tin in such a way that a composition optimized in regard to the avoidance of intercrystalline corrosion may be achieved. This ensures good corrosion resistance of the AlMn sheet produced according to the present invention and high strength at the same time.

The latter particularly applies if the ratio of the tin content [% Sn] to the silicon content [% Sn] of the melt is ≧0.03, with the interaction of the content of silicon and tin able to be optimized further if the ratio [% Sn]/[% Si] may be set to ≧0.1.

Adding tin by alloying in the ratio indicated is necessary, at the latest, when the Si content of the melt is at least 0.75 weight-percent. However, adding tin in the ratios indicated is advisable even at Si contents of 0.5 weight-percent and more.

If the upper limit of the range predetermined for the Si content is restricted to at most 1.0 weight-percent, aluminum sheets in which, on one hand, an optimized high strength and, on the other hand, a minimized danger of intercrystalline corrosion are present may be produced particularly reliably in the way according to the present invention.

Iron encourages the formation of primary phases which bind silicon. Therefore, according to the present invention, the iron content is limited to at most 0.5 weight-percent. Through this limitation of the iron content, it is ensured that, under the manufacturing conditions according to the present invention, silicon is kept in solution. This may be ensured particularly reliably if the iron content is limited to at most 0.3 weight-percent.

The content of copper is limited to at most 0.1 weight-percent, preferably 0.05 weight-percent, in the alloy used according to the present invention. Copper does elevate strength, but also leads to a positive corrosion potential. A positive corrosion potential, however, restricts the possibilities of combination with other materials. In addition, the corrosion behavior, particularly in regard to intercrystalline corrosion, worsens with increasing Cu content.

The Mn content of the melt provided according to the present invention of at least 1.0 to at most 1.8 weight-percent supports the strength of the sheet according to the present invention. Optimized strength values may be reliably achieved if the Mn content of the melt is at least 1.3 weight-percent and at most 1.5 weight-percent.

Magnesium is added to an alloy used according to the present invention as a strength-increasing element. However, since, at higher contents, magnesium has a negative influence on the solderability in inert gas soldering (CAB soldering), the content of magnesium is restricted to at most 0.3 weight-percent according to the present invention. If particularly critical soldering processes are to be accomplished, a restriction of the magnesium content to at most 0.1 weight-percent has a favorable effect on the work result.

The strength and corrosion resistance are further improved by the addition of Cr and/or Zr to the alloy used according to the present invention. If the sum of the contents of Cr and Zr is kept in the range from 0.05–0.4 weight-percent, this leads to the formation of a long life microstructure (elongated, coarse grains), in which the formation of intercrystalline corrosion is impeded due to the reduced grain boundary surfaces. However, in combination with Mn, Fe, and Ti, Cr and Zr may lead to coarse precipitations, which in turn have a negative influence on the deformability and strength of the sheets produced according to the present invention. Therefore, in the alloy used according to the present invention, the chromium and/or zirconium content is elevated for low Mn contents, while it is reduced for high Mn contents.

The positive effects of Cr and/or Zr may be used particularly reliably if the content of Cr in the melt is in the range from at least 0.1 weight-percent to at most 0.2 weight-percent and the content of Zr is at most 0.05 weight-percent.

In order to avoid the negative influence of zinc on the corrosion of aluminum sheets of the type under discussion, the Zn content is restricted to no more than 0.1 weight-percent, preferably to no more than 0.05 weight-percent.

Titanium may be added to the alloy used according to the present invention for grain refinement of the casting microstructure in contents up to 0.1 weight-percent, preferably up to 0.05 weight-percent.

According to the current practice, continuously cast ingots are processed from the melt as the precursor material. However, precursor material produced in another way may also, of course, be used as the starting product for the production of AlMn sheets according to the present invention.

The method according to the present invention allows hot rolling to be performed at a comparatively low preheating temperature of the metal of less than 520° C., which leads to a microstructure of the hot strip produced which is optimized in regard to deformability and corrosion resistance. In consideration of good reliability of the precursor material, the preheating temperature is at least 400° C. in this case.

It is particularly favorable if the precursor material is heated to at most 470° C. and the dwell time during the preheating is limited to at most 5 hours in order to keep the greatest possible proportion of Mn in solution. The manganese kept in solution is precipitated finely dispersed during the subsequent annealing (soft annealing/re-annealing) and in the soldering process and thus leads to the desired high strength, particularly to the high values of the limit of elasticity $R_{p0.2}$. The starting temperature of the precursor material during the hot rolling is preferably at least 400° C. for the reasons already described. In this case, the final rolling temperature during the hot rolling is above 250° C., preferably above 300° C., in order to ensure, on one hand, sufficient deformability of the precursor material and, on the other hand, optimized microstructure formation during the hot rolling. The hot strip thicknesses are in the range from 2 to 10 mm.

An annealing treatment performed at the end of the method according to the present invention is used to adjust the condition of delivery. The annealing treatment may, in this case, include soft annealing or re-annealing of the cold strip in the coil or in the continuous annealing furnace. If soft annealing is performed, the temperature of the AlMn sheet during the soft annealing is to be at least 300° C., preferably at least 350° C. The strip treated by annealing in this way is delivered to the manufacturer in the state "0" (soft annealed).

In contrast, if material is to be delivered in the tempered state, for example in the state H22 (strain hardened, re-annealed, ¼ hard), H24 (strain hardened, re-annealed, ⅖ hard), or in the state H26 (strain hardened, re-annealed, ¾ hard), the annealing treatment is performed as re-annealing in the coil or in the continuous annealing furnace using a temperature to be adjusted accordingly.

Typical thicknesses of the cold rolled finished strip are between 50 and 500 µm.

For further processing of the strip produced according to the present invention, it may also be favorable if the strip is cladded on one or both sides using one or two Al alloys, using cladding layer thicknesses of 3% to 20% of the total thickness of the strip on each side. The alloys concerned may, for example, be typical soldering alloys, such as EN AW-4045, EN AW-4343, EN AW-4004, EN AW-4104, and their modifications, as well as typical protective claddings, such as EN AW-1050, EN AW-1050A, EN AW-7072, and their modifications. The cladding is preferably applied in this case by roll cladding.

In the following, the invention is described in more detail with reference to exemplary embodiments:

In Table 1, the contents of the alloy elements are listed for AlMn sheets 1 to 8.

TABLE 1

|   | Si | Fe | Cu | Mn | Mg | Cr | Zn | Ti | Zr | Sn |
|---|----|----|-----|----|-----|----|----|-----|----|-----|
| 1 | 0.89 | 0.31 | 0.011 | 1.08 | 0.001 | 0.170 | 0.006 | 0.008 | — | — |
| 2 | 0.90 | 0.30 | 0.010 | 1.05 | 0.001 | 0.005 | 1.090 | 0.007 | — | — |
| 3 | 0.55 | 0.27 | 0.009 | 1.42 | 0.031 | 0.011 | 0.007 | 0.005 | — | — |
| 4 | 0.57 | 0.30 | 0.140 | 1.07 | 0.028 | 0.116 | 0.004 | 0.006 | — | — |
| 5 | 0.84 | 0.29 | 0.008 | 1.33 | 0.063 | 0.111 | 0.005 | 0.009 | — | — |
| 6 | 0.81 | 0.31 | 0.009 | 1.37 | 0.070 | 0.123 | 0.004 | 0.005 | — | 0.034 |
| 7 | 0.43 | 0.31 | 0.013 | 1.03 | 0.001 | 0.015 | 0.007 | 0.008 | — | — |
| 8 | 0.74 | 0.27 | 0.014 | 1.36 | 0.083 | 0.130 | 0.004 | 0.011 | — | 0.089 |

(Contents indicated in weight-percent.)

Ingots were continuously cast from a melt having each of the corresponding compositions. This ingot precursor material was subsequently preheated to a preheating temperature which was between 400° C. and 520° C., preferably from 400° C. to 470° C.

The precursor material preheated in this way was hot rolled, using a hot rolling final temperature of at least 250° C., preferably 300° C., to a hot strip thickness of 3.5 mm. Subsequently, the hot strip was cold rolled in one or more passes to its final thickness of 100 μm. Intermediate annealing was not performed during the cold rolling.

Finally, to adjust the condition of delivery, an annealing treatment was performed, with soft annealing or re-annealing being performed according to the instructions of the manufacturer.

The cold rolled strips were finally packaged into sheets.

The AlMn sheets produced in this way had, in the soft-annealed delivery state, a limit of elasticity $R_{p0.2}$ of at most 80 MPa, a tensile strength $R_m$ of at least 100 MPa, and a fracture elongation $A_{100}$ of at least 3%.

Plates were manufactured from the AlMn sheets 1 to 8 of Table 1, which were intended for producing heat exchangers for automobile engines. The sheets were able to be cold formed using a bending radius of less than 1 mm for a 180° bend.

After the manufacturing of the heat exchangers by soldering, these plates each had a limit of elasticity $R_{p0.2}$ of at least 60 MPa, in many examples more than 65 MPa, and a varying corrosion resistance. The tensile tests to determine the mechanical characteristic values were performed in this case with reference to strip sections which were subjected to a simulated soldering cycle. The soldering cycle was performed, starting from room temperature, using a heating rate of approximately 25 K/min., a dwell time of 3 min. at a temperature of 600° C., and a subsequent cooling to room temperature using a cooling rate of approximately 40 K/min. In Table 2, the limits of elasticity $R_{p0.2}$ and an evaluation of the corrosion resistance for sheets 1 to 8 of Table 1 in the soldered state are indicated.

TABLE 2

|   | Soldered State | | | |
|---|---|---|---|---|
|   | $R_{p0.2}$ [MPa] | Order[1]) | Extent of Corrosion[2]) | Proneness against intercrystalline corrosion[2]) |
| 1 | 65 | 7 | 4.0 | 2.5 |
| 2 | 62 | 2 | 2.5 | 1.5 |
| 3 | 64 | 13 | 4.5 | 4.0 |
| 4 | 66 | 9 | 3.0 | 3.0 |
| 5 | 69 | 8 | 4.0 | 3.0 |
| 6 | 70 | 11 | 4.0 | 4.0 |
| 7 | 60 | 14 | 5.0 | 4.5 |
| 8 | 70 | 15 | 4.5 | 5.0 |

[1])15 = outstanding; 1 = very poor
[2])5.0 = outstanding; 1.0 = very poor

It is noteworthy that sheet 5, which did not contain any tin at a Si content [% Si] of 0.84 weight-percent, had significantly worse corrosion behavior than similarly composed sheet 6, whose Sn content [% Sn] was 0.034 weight-percent at a content [% Si] of Si of 0.81 weight-percent, so that the ratio [% Sn]/[% Si] was 0.042 in sheet 6. Sheet 8 had even better corrosion properties in the soldered state, in which the ratio [% Sn]/[% Si] was 0.120. As the result of sheet 7, having a content [% Si] of Si of 0.43 weight-percent and without the addition of tin, shows, very good corrosion behavior may also be achieved through low Si contents. However, this does not lead to high values for the limit of elasticity $R_{p0.2}$, such as those achieved, for example, in sheets 6 and 8 having higher Si contents. Furthermore, the negative influence of Cu (sheet 4) and particularly Zn (sheet 1) the corrosion behavior is noteworthy.

What is claimed is:

1. A method for producing an AlMn strip or sheet for producing a component by soldering, said method comprising:

producing a precursor material from a melt, said melt comprising (by weight):
0.3 to 1.2% Si;
not more than 0.5% Fe;
not more than 0.1% Cu;
1.0 to 1.8% Mn;
not more than 0.3% Mg;
a sum of Cr and Zr in the range 0.05 to 0.4%;
not more than 0.1% Zn;
not more than 0.1% Ti;
not more than 0.15% Sn;
unavoidable companion elements; and aluminum as the remainder;
wherein any one of said unavoidable companion elements individually amounts to at most 0.05%; and all of said unavoidable companion elements collectively amount to at most 0.15%; and wherein the ratio of weight percent Sn to weight percent Si is not less than 0.03;
preheating said precursor material at a preheating temperature of less than 520° C. over a dwell time of at most 12 hours;
hot rolling said precursor material to produce a hot-rolled strip, said hot rolling comprising a final hot rolling at a temperature of at least 250° C.; and
cold rolling said hot-rolled strip to produce a cold-rolled strip or sheet without intermediate annealing.

2. The method according to claim 1 wherein the ratio of weight percent Sn to weight percent Si is not less than 0.1.

3. The method according to claim 1 or 2 wherein said melt comprises, by weight, at least 0.5% Si.

4. The method according to claim 1 or 2 wherein said melt comprises, by weight, at least 0.75% Si.

5. The method according to claim 1 wherein said melt comprises, by weight, at most 1.0% Si.

6. The method according to claim 1 wherein said melt comprises, by weight, at most 0.3% Fe.

7. The method according to claim 1 wherein said melt comprises, by weight, at most 0.05% Cu.

8. The method according to claim 1 wherein said melt comprises, by weight:
   at least 1.3% Mn; and
   at most 1.5% Mn.

9. The method according to claim 1 wherein said melt comprises, by weight, at most 0.1% Mg.

10. The method according to claim 1 wherein said melt comprises, by weight;
    at least 0.1% Cr; and
    at most 0.2% Cr.

11. The method according to claim 1 wherein said melt comprises, by weight, at most 0.05% Zr.

12. The method according to claim 1 wherein said melt comprises, by weight, at most 0.05% Zn.

13. The method according to claim 1 wherein said melt comprises, by weight, at most 0.05% Ti.

14. The method according to claim 1 wherein said AlMn strip or sheet after soldering comprises a limit of elasticity $R_{P0.2}$ of at least 60 Mpa.

15. The method according to claim 14 wherein said limit is at least 65 Mpa.

16. The method according to claim 1 wherein said producing comprises continuously casting ingots from said melt.

17. The method according to claim 1 wherein said preheating temperature is at most 470° C.

18. The method according to claim 1 wherein said preheating temperature is at least 400° C.

19. The method according to claim 1 wherein said dwell time is at most 5 hours.

20. The method according to claim 1 wherein said hot rolling comprises hot rolling said precursor material into a hot-rolled strip having a thickness that is in the range of 2 to 10 mm.

21. The method according to claim 1 wherein said final hot rolling is at a temperature of at least 250° C.

22. The method according to claim 1 wherein said final hot rolling is at a temperature of at least 300° C.

23. The method according to claim 1 further comprising subjecting said cold-rolled strip or sheet to an annealing treatment.

24. The method according to claim 23 wherein said subjecting comprises annealing said cold-rolled strip or sheet in a coil.

25. The method according to claim 23 wherein said subjecting comprises annealing said cold-rolled strip or sheet in a continuous furnace.

26. The method according to claim 23 wherein the temperature of said cold-rolled strip or sheet is at least 300° C. during said annealing treatment.

27. The method according to claim 23 wherein the temperature of said cold-rolled strip or sheet is at least 350° C. during said annealing treatment.

28. The method according to claim 1 wherein said cold rolling comprises cold rolling said hot-rolled strip into a cold-rolled strip or sheet having a thickness that is between 50 $\mu$m and 500 $\mu$m.

29. The method according to claim 1 further comprising, when said cold-rolled strip or sheet comprises a first side and a second side, applying a first cladding layer to at least one of said sides;
   wherein:
      the sum of thicknesses of (1) cladding layers applied in said applying, and (2) said strip or sheet defines a total thickness; and
      the thickness of said first cladding layer is from 3% to 20% of said total thickness.

30. The method according to claim 29 wherein said applying comprises:
   applying said first cladding layer to one of said sides, said first cladding layer comprising a first aluminum alloy; and
   applying a second cladding layer to another of said sides, said second cladding layer comprising a second aluminum alloy;
   wherein the thickness of said second cladding layer is from 3% to 20% of said total thickness.

31. The method according to claim 30 wherein both of said applyings comprise using hot roll cladding.

32. An AlMn strip or sheet produced according to the method of claim 1.

33. The AlMn strip or sheet of claim 32 wherein said AlMn strip or sheet after soldering comprises a limit of elasticity $R_{P0.2}$ of at least 60 Mpa.

34. The AlMn strip or sheet of claim 32 wherein the limit of elasticity $R_{P0.2}$ of said AlMn strip or sheet after soldering is at least 65 Mpa.

* * * * *